United States Patent
Xiao et al.

(10) Patent No.: US 11,232,031 B2
(45) Date of Patent: Jan. 25, 2022

(54) ALLOCATION OF MEMORY RANKS BASED ON ACCESS TRAFFIC

(71) Applicant: Huawei Technologies Co., Ltd., Shenzhen (CN)

(72) Inventors: Shihai Xiao, Moscow (RU); Xing Hu, Shenzhen (CN); Kanwen Wang, Hangzhou (CN); Wei Yang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 88 days.

(21) Appl. No.: 16/419,260

(22) Filed: May 22, 2019

(65) Prior Publication Data
US 2019/0272230 A1 Sep. 5, 2019

Related U.S. Application Data

(63) Continuation of application No. PCT/CN2016/106987, filed on Nov. 23, 2016.

(51) Int. Cl.
*G06F 12/06* (2006.01)
*G06F 12/10* (2016.01)
*G06F 12/02* (2006.01)

(52) U.S. Cl.
CPC .......... *G06F 12/0653* (2013.01); *G06F 12/02* (2013.01); *G06F 12/0607* (2013.01);
(Continued)

(58) Field of Classification Search
None
See application file for complete search history.

(56) References Cited

U.S. PATENT DOCUMENTS 6,108,745 A * 8/2000 Gupta ................. G06F 12/0215
711/127
6,330,647 B1 * 12/2001 Jeddeloh ............... G06F 13/161
710/40
(Continued)

FOREIGN PATENT DOCUMENTS

CN 1963788 A 5/2007
CN 102681946 A 9/2012
(Continued)

OTHER PUBLICATIONS

Jeong, M.K. et al., "Balancing DRAM Locality and Parallelism in Shared Memory CMP Systems," IEEE, 2011, 12 pages.
(Continued)

*Primary Examiner* — William E. Baughman
(74) *Attorney, Agent, or Firm* — Slater Matsil, LLP (57) ABSTRACT

A memory allocation method and a device, where the method is applied to a computer system including a processor and a memory, and comprises, after receiving a memory access request carrying a to-be-accessed virtual address and determining that no memory page has been allocated to the virtual address, the processor selecting a target rank group from at least two rank groups of the memory based on access traffic of the rank groups. The processor selects, from idle memory pages, a to-be-allocated memory page for the virtual address, where information about a first preset location in a physical address of the to-be-allocated memory page is the same as first portions of address information in addresses of ranks in the target rank group.

20 Claims, 6 Drawing Sheets

(52) U.S. Cl.
CPC ........ *G06F 12/10* (2013.01); *G06F 2212/653* (2013.01); *G06F 2212/657* (2013.01)

(56) References Cited

U.S. PATENT DOCUMENTS

| | | | |
|---|---|---|---|
| 7,249,241 B1* | 7/2007 | Chu | G06F 12/1081 |
| | | | 710/22 |
| 9,959,060 B1* | 5/2018 | Tang | G06F 3/0644 |
| 2005/0273574 A1* | 12/2005 | Lin | G06F 12/1036 |
| | | | 711/207 |
| 2006/0248261 A1 | 11/2006 | Jacob et al. | |
| 2007/0162715 A1 | 7/2007 | Tagawa | |
| 2009/0276648 A1* | 11/2009 | Haustein | G06F 3/0631 |
| | | | 713/320 |
| 2010/0332775 A1* | 12/2010 | Kapil | G06F 12/0607 |
| | | | 711/157 |
| 2012/0102270 A1 | 4/2012 | Chishti et al. | |
| 2013/0170274 A1 | 7/2013 | Yu et al. | |
| 2013/0268741 A1 | 10/2013 | Daly et al. | |
| 2016/0147623 A1* | 5/2016 | Ping | G06F 11/1666 |
| | | | 714/6.13 |
| 2016/0306567 A1* | 10/2016 | Yang | G06F 12/023 |
| 2018/0019006 A1* | 1/2018 | Brandl | G11C 11/408 |

FOREIGN PATENT DOCUMENTS

| | | |
|---|---|---|
| CN | 102880552 A | 1/2013 |
| CN | 103559137 A | 2/2014 |
| CN | 105068940 A | 11/2015 |
| CN | 106055495 A | 10/2016 |

OTHER PUBLICATIONS

Kim, N. et al., "A memory allocation and assignment method using multiway partitioning", IEEE International SOC Conference, 2004 Proceedings, Nov. 30, 2004, 2 pages.

Qi, Z.,et al, "Data Object Scale Aware Rank-Level Memory Allocation", Journal of Computer Research and Development, 2014, 9 pages, (With an English Abstract).

* cited by examiner

ALLOCATION OF MEMORY RANKS BASED ON ACCESS TRAFFIC

CROSS-REFERENCE TO RELATED APPLICATIONS

This application is a continuation of International Application No. PCT/CN2016/106987, filed on Nov. 23, 2016, the disclosure of which is hereby incorporated by reference in its entirety.

TECHNICAL FIELD

This application relates to the computer field, and in particular, to a memory allocation method and a device.

BACKGROUND

Figure 1:
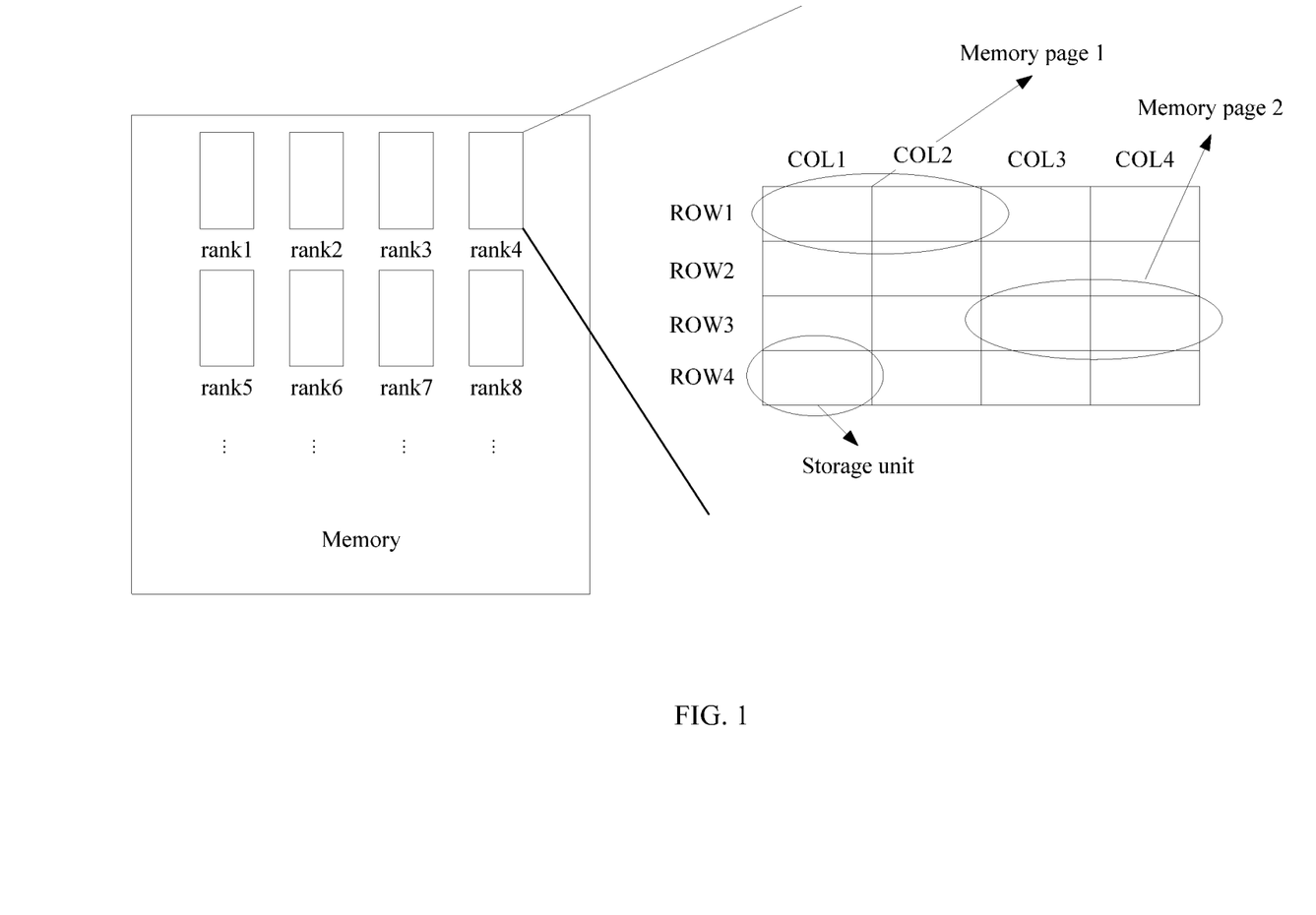
FIG. 1 is a schematic structural diagram of a memory provided in the prior art.

A computer system includes a processor, a memory controller, and a memory. As shown in FIG. 1, the memory includes a plurality of ranks. A rank may be understood as a matrix formed by a plurality of storage units. A row of the matrix is marked as row (ROW), and a column of the matrix is marked as column (COL). There may be a mapping relationship between one rank and a plurality of memory pages. There is a mapping relationship between each memory page and one rank. A memory page includes a plurality of storage units. In FIG. 1, each rank includes four ROWs and four COLs, and a memory page includes two storage units.

A memory access process of the processor may include the following. After receiving a memory access request that carries a to-be-accessed virtual address and that is sent by an application program, if the processor finds that a memory page has been allocated to the to-be-accessed virtual address, the processor sends, to the memory controller, a memory access request carrying a physical address corresponding to the to-be-accessed virtual address. The memory controller first needs to activate a to-be-accessed storage unit before accessing the storage unit. The memory controller may activate one or more ranks at a time. If finding that no memory page has been allocated to the to-be-accessed virtual address, the processor may randomly allocate an idle memory page to the application program.

However, according to the foregoing memory allocation method, memory pages allocated by the processor to one application program may be concentrated in one rank. When activating a rank in the memory access process of the processor, the memory controller activates a maximum of four ROWs in the rank at a time. Consequently, a data access rate is reduced.

SUMMARY

Embodiments of the present invention provide a memory allocation method and a device, to improve a data access rate of a memory controller in a memory access process of a processor, thereby improving overall performance.

To achieve the foregoing objective, the following technical solutions are used in the embodiments of the present invention.

According to a first aspect, a memory allocation method is provided and is applied to a computer system. The computer system includes a processor and a memory, the memory includes at least two rank groups, each rank group includes at least two ranks, first portions of address information in addresses of ranks in one rank group are the same, there is a mapping relationship between the first portion of address information and information about a first preset location in a physical address of a memory page in the memory, and the first preset location is a portion of page number information in the physical address. The method may include receiving, by the processor, a memory access request, where the memory access request carries a to-be-accessed virtual address, when determining that no memory page has been allocated to the to-be-accessed virtual address, selecting, by the processor, a target rank group from the at least two rank groups based on access traffic of the at least two rank groups, and selecting, from idle memory pages, a to-be-allocated memory page for the memory access request, where information about a first preset location in a physical address of the to-be-allocated memory page is the same as first portions of address information in addresses of ranks in the target rank group.

According to the memory allocation method provided in this application, because first portions of address information in addresses of ranks in one rank group are the same, there is a mapping relationship between the first portion of address information and information about a first preset location in a physical address of a memory page in the memory, and one memory page may include a plurality of storage units, the processor may distribute storage units in one memory page in ranks of one rank group according to a specific allocation policy, thereby ensuring that a memory page allocated to one application program can span a plurality of ranks. In this way, a memory controller can activate a plurality of ranks in a memory access process of the processor, thereby increasing a data access rate. In addition, the processor determines the target rank group based on the access traffic of the rank groups, and uses the idle memory page corresponding to the target rank group as the to-be-allocated memory page. Compared with a prior-art solution in which any idle memory page is used as a to-be-allocated memory page, in this application, the processor uses an idle memory page corresponding to a rank group with relatively large access traffic as a to-be-allocated memory page, leading to a relatively low probability of rank group switching in a process of accessing the memory page by the processor, thereby reducing rank switching overheads.

In a possible design, an address of each rank in the memory may further include a second portion of address information, there is a mapping relationship between the second portion of address information and information about a second preset location in a physical address of a memory page, and the second preset location is a portion of page offset information in the physical address.

In a possible design, the selecting, by the processor, a target rank group from the at least two rank groups based on access traffic of the at least two rank groups may include selecting, by the processor from the at least two rank groups, a rank group with largest access traffic as the target rank group. In this way, the processor can have a lower probability of rank group switching in the process of accessing the memory page, thereby reducing rank switching overheads.

In a possible design, the selecting, by the processor, a target rank group from the at least two rank groups based on access traffic of the at least two rank groups may include obtaining, by the processor, access traffic of ranks in the at least two rank groups, and when determining that access traffic of a first rank in a first rank group of the at least two rank groups exceeds total access traffic of the other ranks in the at least two rank groups, selecting a second rank group in the at least two rank groups as the target rank group, where access traffic of the second rank group is less than access traffic of the first rank group. In this way, an idle memory page corresponding to the target rank group may be allocated to equalize the access traffic of the ranks in the memory to some extent, so as to improve overall performance.

In a possible design, the selecting, by the processor, a target rank group from the at least two rank groups based on access traffic of the at least two rank groups may include obtaining, by the processor, access traffic of ranks in the at least two rank groups, and selecting, from the at least two rank groups, a rank group to which a rank whose access traffic is less than a first preset threshold and is greater than 0 belongs as the target rank group. In this way, an idle memory page corresponding to the target rank group may be allocated to increase access traffic of the target rank group, and equalize the access traffic of the ranks in the memory to some extent, so as to improve overall performance. In addition, a rank group to which a rank whose access traffic is 0 belongs is not selected as the target rank group. This can reduce rank switching overheads.

In a possible design, the selecting, by the processor, a target rank group from the at least two rank groups based on access traffic of the at least two rank groups may include selecting, by the processor from the at least two rank groups, a rank group whose access traffic is less than a second preset threshold and is greater than 0 as the target rank group. In this way, an idle memory page corresponding to the target rank group may be allocated to increase the access traffic of the target rank group, and equalize access traffic of ranks in the memory to some extent, so as to improve overall performance. In addition, a rank group to which a rank whose access traffic is 0 belongs is not selected as the target rank group. This can reduce rank switching overheads.

According to a second aspect, a computing device is provided, where the computing device includes a processor and a memory, the memory includes at least two rank groups, each rank group includes at least two ranks, first portions of address information in addresses of ranks in one rank group are the same, there is a mapping relationship between the first portion of address information and information about a first preset location in a physical address of a memory page in the memory, and the first preset location is a portion of page number information in the physical address. The processor is configured to receive a memory access request, where the memory access request carries a to-be-accessed virtual address, when determining that no memory page has been allocated to the to-be-accessed virtual address, select a target rank group from the at least two rank groups based on access traffic of the at least two rank groups, and select, from idle memory pages, a to-be-allocated memory page for the memory access request, where information about a first preset location in a physical address of the to-be-allocated memory page is the same as first portions of address information in addresses of ranks in the target rank group.

In a possible design, an address of each rank in the memory further includes a second portion of address information, there is a mapping relationship between the second portion of address information and information about a second preset location in a physical address of a memory page, and the second preset location is a portion of page offset information in the physical address.

In a possible design, the processor may be specifically configured to select, from the at least two rank groups, a rank group with largest access traffic as the target rank group.

In a possible design, the processor may be specifically configured to when determining that access traffic of a first rank in a first rank group of the at least two rank groups exceeds total access traffic of the other ranks in the at least two rank groups, select a second rank group in the at least two rank groups as the target rank group, where access traffic of the second rank group is less than access traffic of the first rank group.

In a possible design, the processor may be specifically configured to obtain access traffic of ranks in the at least two rank groups, and select, from the at least two rank groups, a rank group to which a rank whose access traffic is less than a first preset threshold and is greater than 0 belongs as the target rank group.

In a possible design, the processor may be specifically configured to select, from the at least two rank groups, a rank group whose access traffic is less than a second preset threshold and greater than 0 as the target rank group.

According to a third aspect, a structure of a physical address of a memory is provided and is applied to a computer system. The computer system includes a processor and a memory, the memory includes at least two rank groups, each rank group includes at least two ranks, and first portions of address information in addresses of ranks in one rank group are the same. An address of each rank in the memory further includes a second portion of address information. The physical address includes page number information and page offset information. There is a mapping relationship between information about a first preset location in the page number information and the first portion of address information, and there is a mapping relationship between information about a second preset location in the page offset information and the second portion of address information.

According to a fourth aspect, a method for obtaining an address of a rank is provided. The method may include obtaining, by a memory controller, information about a first preset location in page number information of a physical address, to obtain a first portion of address information of the rank, obtaining information about a second preset location in page offset information of the physical address, to obtain a second portion of address information of the rank, and obtaining the address of the rank based on the first portion of address information of the rank and the second portion of address information of the rank. A structure of the physical address may be the structure of the physical address described in the third aspect.

Optionally, based on the fourth aspect, the memory controller may determine ranks whose first portions of address information are the same as one rank group, to calculate access traffic, in a preset time segment, of a rank group to which the rank belongs.

According to a fifth aspect, a computing device is provided. The computing device includes a memory controller, where the memory controller is configured to obtain information about a first preset location in page number information of a physical address, to obtain a first portion of address information of a rank, obtain information about a second preset location in page offset information of the physical address, to obtain a second portion of address information of the rank, and obtain an address of the rank based on the first portion of address information of the rank and the second portion of address information of the rank. A structure of the physical address may be the structure of the physical address described in the third aspect.

According to another aspect, an embodiment of the present invention provides a processor, where the processor includes modules configured to execute the method provided in the first aspect and possible implementations of the first aspect.

According to another aspect, a computer-readable storage medium is provided. The computer-readable storage medium stores a computer-executable instruction. When at least one processor of a computing device executes the computer-executable instruction, the computing device executes the memory allocation method provided in the first aspect or any possible implementation of the first aspect.

According to another aspect, an embodiment of the present invention provides a memory controller, where the memory controller includes modules configured to execute the method described in the third aspect.

According to another aspect, a computer-readable storage medium is provided. The computer-readable storage medium stores a computer-executable instruction. When at least one processor of a computing device executes the computer-executable instruction, the computing device executes the memory allocation method provided in the first aspect.

It can be understood that any computing device or computer storage medium provided above is configured to execute the memory allocation method provided above. For beneficial effects that can be achieved by the memory allocation method, refer to the beneficial effects of the corresponding memory allocation method provided above. Details are not repeated herein.

DETAILED DESCRIPTION OF ILLUSTRATIVE EMBODIMENTS

Figure 2:
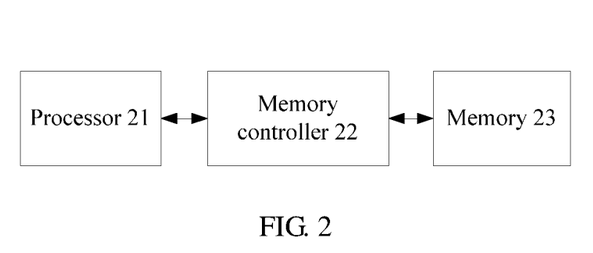
FIG. 2 is a schematic architecture diagram of a system to which technical solutions provided in embodiments of the present invention is applicable.

Technical solutions provided in the embodiments of the present invention may be applicable to a computer system shown in FIG. 2. The computer system shown in FIG. 2 includes a processor 21, a memory controller 22, and a memory 23. The processor 21 is a control center of the computer system. The memory controller 22 is configured to manage data in the memory 23.

In the embodiments of the present invention, the memory 23 is divided into a plurality of rank groups, and each rank group may include at least two ranks. A quantity of ranks included in each rank group may be preset, or may be changed based on an actual requirement (for example, a requirement on a data access rate of the memory controller and a requirement on rank switching overheads). A rank may be a collection of dynamic random access memory (DRAM) chips. These chips are connected to a same chip select signal.

Figure 3:
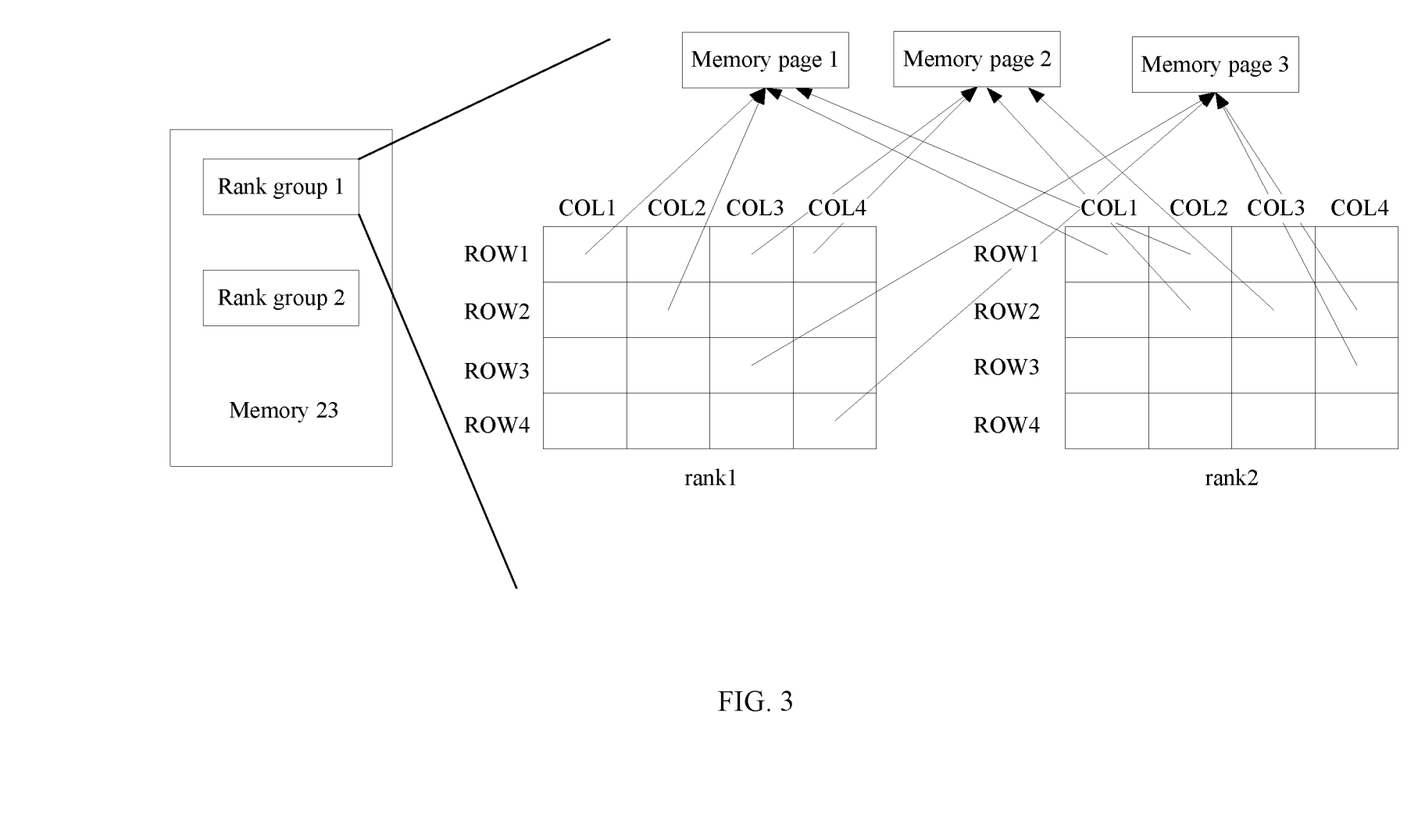
FIG. 3 is a schematic structural diagram of a memory according to an embodiment of the present invention.

For example, one rank group may include two ranks or four ranks. Quantities of ranks included in different rank groups may be the same or may be different. Generally, quantities of ranks included in different rank groups are the same. As shown in FIG. 3, the memory includes two rank groups, each rank group includes two ranks, each rank includes four ROWs and four COLs, each rank group includes three memory pages, and each memory page includes four storage units.

There may be a mapping relationship between each rank group and one or more memory pages, and the storage units included in each memory page may be distributed in ranks of one rank group. One memory page may include a plurality of storage units. In the embodiments of the present invention, distribution, in one rank group, of storage units in one memory page is not limited. For example, storage units in one memory page may be distributed in ranks of one rank group according to an even allocation policy.

It should be noted that the distribution, in one rank group, of storage units in one memory page relates to a method for determining an idle memory page. It can be understood that storage units in one memory page provided in the prior art are distributed in one rank, while in the embodiments of the present invention, storage units in one memory page are distributed in ranks of one rank group.

An implementation of distributing one memory page in ranks of one rank group is as follows. Each storage unit has a physical address. The physical address includes page number (PAGE NUM) information and page offset (PAGE OFFSET) information. In other words, the physical address includes a PAGE NUM field and a PAGE OFFSET field. An address of each rank includes a first portion of address information and a second portion of address information. There is a mapping relationship between the first portion of address information and information about a first preset location, and the first preset location is a portion of the page number information in the physical address. In addition, first portions of address information in addresses of ranks in one rank group are the same. In addition, there is a mapping relationship between the second portion of address information and information about a second preset location, and the second preset location is a portion of the page offset information in the physical address. A physical address of a memory page is a physical address of a storage unit included in the memory page.

Figure 4:
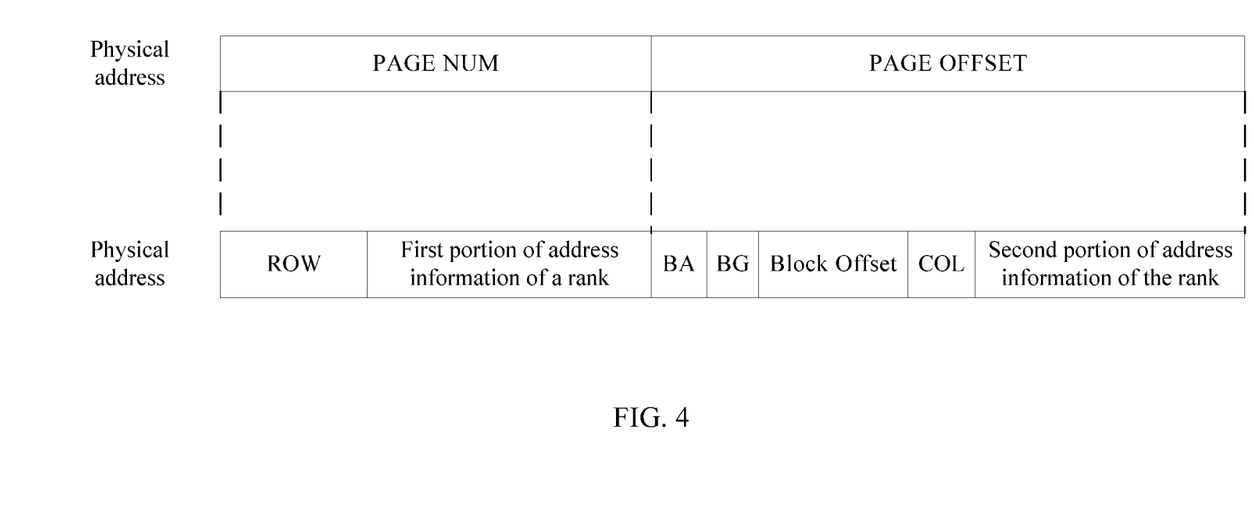
FIG. 4 is a schematic structural diagram of a physical address of a memory page according to an embodiment of the present invention.

As shown in FIG. 4, FIG. 4 is a schematic structural diagram of a physical address of a memory page according to an embodiment of the present invention. A PAGE NUM field may include a first portion of address information of a rank, a ROW in which the physical address is located, and a COL in which the physical address is located. A PAGE OFFSET field includes a second portion of address information of the rank, a BA, a BG, a COL, and a block offset. BA is short for bank address, indicating an address of a bank. BG is short for bank group address, indicating an address of a bank group. One rank may include at least two bank groups, and a bank group may include at least two banks. For a relationship between the rank, the bank group, and the bank, refer to the prior art. Details are not provided herein.

For example, if one rank group includes two ranks: rank1 and rank2, a 2-bit binary number may be used to mark an address of each rank. For example, an address of the rank1 may be marked as 00, and an address of the rank2 may be marked as 01. In this case, in the address of each rank, a high-order bit of the binary number may be located in a PAGE NUM field, and a low-order bit of the binary number may be located in a PAGE OFFSET field. Because one memory page includes a plurality of storage units, the manner may be used to configure some storage units included in the memory page to be in the rank1, and configure the other storage units to be in the rank2, thereby ensuring that one memory page is distributed in ranks of one rank group.

For another example, if one rank group includes four ranks: rank1, rank2, rank3, and rank4, a three-bit binary number may be used to mark an address of each rank. For example, an address of the rank1 may be marked as 000, an address of the rank2 may be marked as 001, an address of the rank3 may be marked as 010, and an address of the rank4 may be marked as 011. In this case, in the address of each rank, a highest-order bit of the binary number (namely, "0") may be located in a PAGE NUM field, and the other bits of the binary number (for example, "00", "01", "10", and "11") may be located in a PAGE OFFSET field. Because one memory page includes a plurality of storage units, the manner may be used to configure some storage units included in the memory page to be in the ranks, configure some storage units to be in the rank2, configure some storage units to be in the rank3, and configure the other storage units to be in the rank4, thereby ensuring that one memory page is distributed in ranks of one rank group.

In this specification, the terms "first", "second", and so on are intended to distinguish between different objects but do not indicate a particular order of the objects. The term "a plurality of" in this specification means two or more than two.

Figure 5:
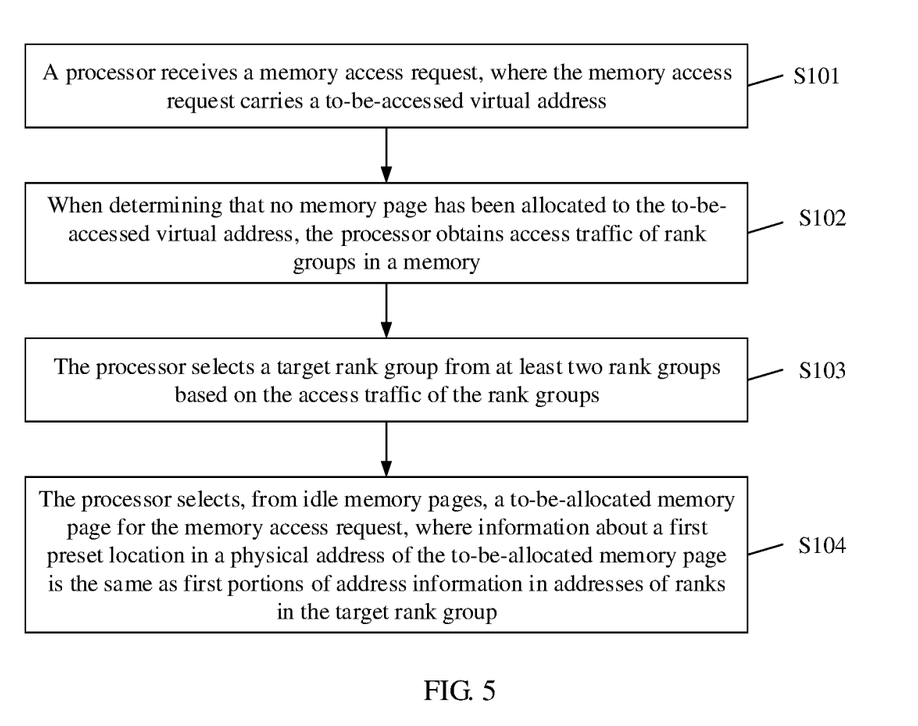
FIG. 5 is a flowchart of a memory allocation method according to an embodiment of the present invention.

As shown in FIG. 5, FIG. 5 is a flowchart of a memory allocation method according to an embodiment of the present invention. The method may be specifically executed by an operating system in a processor. The method may include the following steps S101 to S104.

S101. The processor receives a memory access request, where the memory access request carries a to-be-accessed virtual address.

The memory access request may be a read request, used to read data stored in a storage unit marked by a physical address corresponding to the to-be-accessed virtual address. The memory access request may alternatively be a write request, used to write data into the storage unit marked by the physical address corresponding to the to-be-accessed virtual address. If the memory access request is a write request, the memory access request may further carry to-be-written data.

The operating system in the processor provides a virtual address for an application program, allocates a memory space to the application program based on a requirement of the application program, and records a mapping relationship between the virtual address and a physical address. When receiving the memory access request, the processor may first translate the to-be-accessed virtual address carried in the memory access request to the physical address, and then queries whether a mapping relationship between the to-be-accessed virtual address and the physical address has been recorded. If it is found that the mapping relationship between the to-be-accessed virtual address and the physical address has not been recorded, no memory page has been allocated to the to-be-accessed virtual address. In this case, the following steps S102 to S104 may be performed to allocate a memory page to the virtual address. Then, a memory access request carrying the physical address may be sent to a memory controller. After receiving the memory access request carrying the physical address, the memory controller may access the storage unit marked by the physical address. If the mapping relationship between the to-be-accessed virtual address and the physical address has been recorded, a memory page has been allocated to the to-be-accessed virtual address. In this case, a memory access request carrying the physical address may be sent to a memory controller. After receiving the memory access request carrying the physical address, the memory controller may access the storage unit marked by the physical address.

S102. When determining that no memory page has been allocated to the to-be-accessed virtual address, the processor obtains access traffic of rank groups in a memory.

Access traffic of a rank group may be a quantity of times for which the processor accesses the rank group. The memory controller may calculate access traffic of rank groups in at least two rank groups periodically or upon triggering, and then proactively send the access traffic of the rank groups in the at least two rank groups to the processor. Alternatively, the processor proactively obtains the access traffic of the rank groups in the at least two rank groups from the memory controller.

Figure 6:
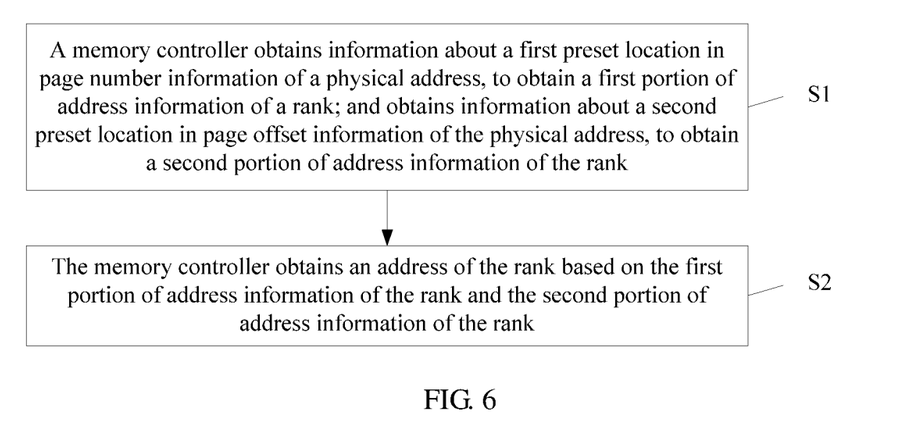
FIG. 6 is a flowchart of a method for obtaining an address of a rank according to an embodiment of the present invention.

After receiving the memory access request that carries the physical address and that is sent by the processor, the memory controller may parse out the physical address to obtain an address of a rank, so as to calculate access traffic, in a preset time segment, of the rank, and further calculate access traffic, in the preset time segment, of a rank group to which the rank belongs. As shown in FIG. 6, a method, provided in this embodiment of the present invention, used by the memory controller to parse out the physical address to obtain the address of the rank may include the following steps S1 and S2.

S1. The memory controller obtains information about a first preset location in page number information of the physical address, to obtain a first portion of address information of the rank, and obtains information about a second preset location in page offset information of the physical address, to obtain a second portion of address information of the rank.

In the physical address shown in FIG. 4, the memory controller may obtain the information about the first preset location in the PAGE NUM field, to obtain the first portion of address information of the rank, and obtain the information about the second preset location in the PAGE OFFSET field, to obtain the second portion of address information of the rank.

S2. The memory controller obtains the address of the rank based on the first portion of address information of the rank and the second portion of address information of the rank.

Based on the example in S1, assuming that the first portion of address information is "o" and the second portion of address information is "01", the address of the rank may be "001".

Based on S1 and S2, the memory controller may determine ranks whose first portions of address information are the same as one rank group, to calculate the access traffic, in the preset time segment, of the rank group to which the rank belongs.

S103. The processor selects a target rank group from at least two rank groups based on the access traffic of the rank groups.

The processor may obtain, in a preset time, the access traffic of the rank groups. Alternatively, when determining that no memory page has been allocated to the to-be-accessed virtual address, the processor may obtain the access traffic of the rank groups. The processor may obtain the access traffic of the rank groups from the memory controller, or obtain the access traffic of the rank groups from a cache. The access traffic of the rank groups in the cache may be access traffic of the rank groups that is obtained by the processor before the processor receives the memory access request.

Optionally, S103 may be implemented in the following manner.

Manner 1: The processor selects, from the at least two rank groups, a rank group with largest access traffic as the target rank group.

It can be understood that the access traffic provided above is historical access traffic. The historical access traffic provides reference for future access traffic. Specifically, it can be considered that a rank group with larger historical access traffic has a higher probability of being accessed in the future. Therefore, if an idle memory page corresponding to the rank group with the largest access traffic is used as a to-be-allocated memory page, the processor can have a lower probability of rank group switching in a process of accessing the memory page, thereby reducing rank switching overheads. Optionally, in actual implementation, to expand a selection range, the processor may use a rank group with relatively large access traffic as the target rank group. In other words, the processor may select, from the at least two rank groups, any group with access traffic greater than a preset threshold as the target rank group.

S104. The processor selects, from idle memory pages, a to-be-allocated memory page for the memory access request, where information about a first preset location in a physical address of the to-be-allocated memory page is the same as first portions of address information in addresses of ranks in the target rank group.

A memory page may be an idle memory page or a non-idle memory page. No data is stored in any storage unit in the idle memory page, and data is stored in one or more storage units in the non-idle memory page. In a memory allocation process, the processor uses an idle memory page as the to-be-allocated memory page. If there is a mapping relationship between the target rank group and a plurality of idle memory pages, the processor may use any one of the plurality of idle memory pages as the to-be-allocated memory page. If there is no mapping relationship between the target rank group and an idle memory page, the processor may re-determine a target rank group based on access traffic of another rank group.

According to the memory allocation method provided in this embodiment of the present invention, because first portions of address information in addresses of ranks in one rank group are the same, there is a mapping relationship between the first portion of address information and information about a first preset location in a physical address of a memory page in the memory, and one memory page may include a plurality of storage units, the processor may distribute storage units in one memory page in ranks of one rank group according to a specific allocation policy, thereby ensuring that a memory page allocated to one application program can span a plurality of ranks. In this way, the memory controller can activate a plurality of ranks in a memory access process of the processor, thereby increasing a data access rate. In addition, the processor determines the target rank group based on the access traffic of the rank groups, and uses the idle memory page corresponding to the target rank group as the to-be-allocated memory page. Compared with a prior-art solution in which any idle memory page is used as a to-be-allocated memory page, in this application, the processor uses an idle memory page corresponding to a rank group with relatively large access traffic as a to-be-allocated memory page, leading to a relatively low probability of rank group switching in a process of accessing the memory page by the processor, thereby reducing rank switching overheads.

Optionally, S103 may alternatively be implemented in any of the following manners.

Manner 2: The processor obtains access traffic of ranks in the at least two rank groups, and when determining that access traffic of a first rank in a first rank group of the at least two rank groups exceeds total access traffic of the other ranks in the at least two rank groups, selects a second rank group in the at least two rank groups as the target rank group, where access traffic of the second rank group is less than access traffic of the first rank group.

Access traffic of a rank is a quantity of times for which the processor accesses the rank. That the access traffic of the first rank in the first rank group of the at least two rank groups exceeds the total access traffic of the other ranks in the at least two rank groups indicates that access traffic of the memory is concentrated in the rank. This case may be considered as an abnormal case. In this case, if the second rank group whose access traffic is less than that of the first rank group is used as the target rank group, an idle memory page corresponding to the target rank group may be allocated to equalize the access traffic of the ranks in the memory to some extent, so as to improve overall performance. Optionally, the processor may use a rank group whose access traffic is less than that of the first rank group as the second rank group.

Manner 3: The processor obtains access traffic of ranks in the at least two rank groups, and then selects, from the at least two rank groups, a rank group to which a rank whose access traffic is less than a first preset threshold and greater than 0 belongs as the target rank group.

In "a rank group to which a rank whose access traffic is less than a first preset threshold and greater than 0 belongs", the "access traffic" is access traffic specific to a rank. If the rank group to which the rank whose access traffic is less than the first preset threshold belongs is used as the target rank group, an idle memory page corresponding to the target rank group may be allocated to increase access traffic of the target rank group, and equalize the access traffic of the ranks in the memory to some extent, so as to improve overall performance. A rank group to which a rank whose access traffic is 0 belongs is not selected as the target rank group, because if the rank group to which the rank whose access traffic is 0 belongs is selected, the rank group not expected to be accessed previously starts to be accessed, or in other words, rank switching inevitably occurs in the process, increasing rank switching overheads.

Manner 4: The processor selects, from the at least two rank groups, a rank group whose access traffic is less than a second preset threshold and is greater than 0 as the target rank group.

In "a rank group whose access traffic is less than a second preset threshold and is greater than 0", the "access traffic" is access traffic specific to a rank group. If the rank group whose access traffic is less than the second preset threshold is used as the target rank group, an idle memory page corresponding to the target rank group may be allocated to increase the access traffic of the target rank group, and equalize access traffic of ranks in the memory to some extent, so as to improve overall performance. A rank group whose access traffic is 0 is not selected as the target rank group, because if the rank group whose access traffic is 0 is selected, the rank group not expected to be accessed previously starts to be accessed, or in other words, rank switching inevitably occurs in the process, increasing rank switching overheads.

The solution provided in the embodiments of the present invention is described above mainly from a perspective of the processor. It can be understood that, to implement the foregoing functions, the processor includes corresponding hardware structures and/or software modules for executing the functions. A person skilled in the art should be easily aware that, the modules and algorithm steps in the examples described with reference to the embodiments disclosed in this specification can be implemented by hardware or a combination of hardware and computer software in the present invention. Whether the functions are executed by hardware or computer software driving hardware depends on particular applications and design constraint conditions of the technical solutions. A person skilled in the art may use different methods to implement the described functions for each particular application, but it should not be considered that the implementation goes beyond the scope of the present invention.

In the embodiments of the present invention, the processor may be divided into function modules according to the foregoing method example. For example, function modules corresponding to various functions may be obtained through division, or two or more functions may be integrated into one processing module. The integrated module may be implemented in a form of hardware, or may be implemented in a form of a software function module. It should be noted that the module division in the embodiments of the present invention is used as an example, is merely logical function division, and may be other division in actual implementation.

Figure 7:
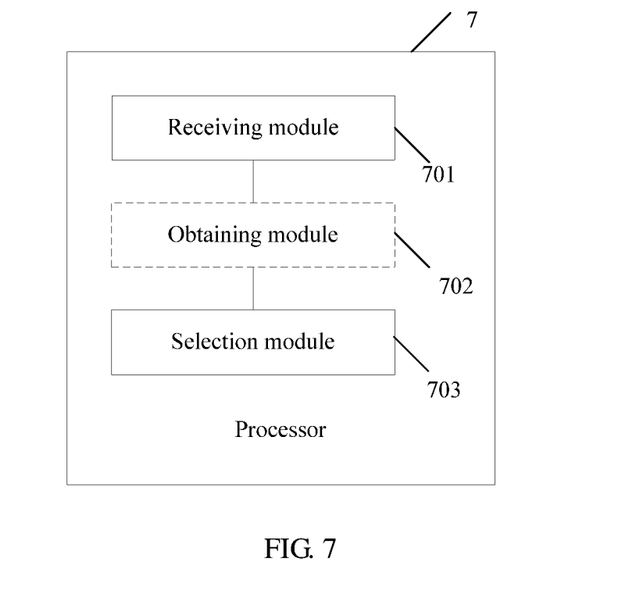
FIG. 7 is a schematic structural diagram of a computing device according to an embodiment of the present invention.

FIG. 7 is a schematic structural diagram of a processor 7. The processor 7 may include a receiving module 701 and a selection module 703. Optionally, the processor 7 may further include an obtaining module 702. The receiving module 701 is configured to support the processor 7 in performing S101 in FIG. 4, and/or used in another process of the technology described in this specification. The obtaining module 702 is configured to support the processor 7 in performing S102 in FIG. 4, and/or used in another process of the technology described in this specification. The selection module 703 is configured to support the processor 7 in performing S103 and S104 in FIG. 4, and/or used in another process of the technology described in this specification. In addition, the processor 7 may further include a storage module. The storage module is configured to store corresponding program code and data that are used by the processor 7 to perform any memory allocation method provided above.

Figure 8:
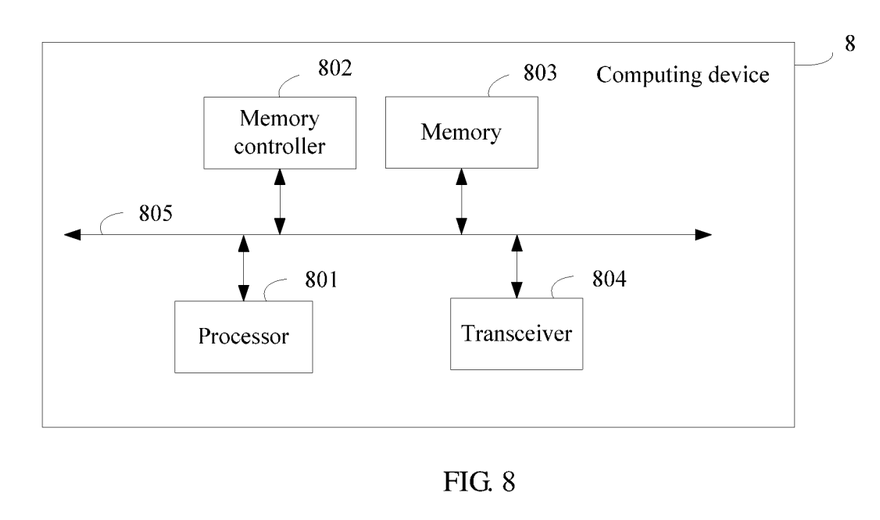
FIG. 8 is a schematic structural diagram of another computing device according to an embodiment of the present invention.

As shown in FIG. 8, FIG. 8 is a schematic structural diagram of a computing device 8 according to an embodiment of the present invention. The computing device 8 may include a processor 801, a memory controller 802, a memory 803, a transceiver 804, and a bus 805. The processor 801, the memory controller 802, the memory 803, and the transceiver 804 are connected to each other by using the bus 805. The processor 801 may be a CPU, a general purpose processor, a digital signal processor (DSP), an application-specific integrated circuit (ASIC), a field programmable gate array (FPGA) or another programmable logic device, a transistor logic device, a hardware component, or any combination thereof. The processor 801 may implement or execute various example logic blocks, modules, and circuits described with reference to content disclosed in the present invention. Alternatively, the processor may be a combination implementing a computing function, for example, a combination of one or more microprocessors, or a combination of the DSP and a microprocessor. The bus 805 may be a peripheral component interconnect (PCI) bus, an extended industry standard architecture (EISA) bus, or the like. The bus may be divided into an address bus, a data bus, a control bus, and the like. For ease of representation, the bus is represented by using only one bold line in FIG. 8. However, it does not mean that there is only one bus or only one type of bus.

The methods or algorithm steps described with reference to the content disclosed in the present invention may be implemented in a hardware manner, or may be implemented in a manner of executing a software instruction by a processing module. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or a storage medium in any other forms well known in the art. A storage medium used as an example is coupled to the processor, so that the processor can read information from the storage medium, and can write information into the storage medium. Certainly, the storage medium may alternatively be a part of the processor. The processor and the storage medium may be located in an ASIC.

A person skilled in the art should be aware that in one or more of the foregoing examples, the functions described in the present invention may be implemented by using hardware, software, firmware, or any combination thereof. When the functions are implemented by using software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general or dedicated computer.

In the foregoing specific implementations, the objectives, technical solutions, and beneficial effects of the present invention are further described in detail. It should be understood that the foregoing descriptions are merely specific implementations of the present invention, and are not intended to limit the protection scope of the present invention.

What is claimed is:

1. A memory allocation method, comprising:
    receiving, by a processor of a computer system, a memory access request requesting access to a memory of the computer system, wherein the memory access request carries a to-be-accessed virtual address;
    selecting, by the processor, a target rank group from at least two rank groups in the memory according to access traffic of the at least two rank groups in response to determining that no memory page has been allocated to the virtual address, wherein the at least two rank groups being controlled by a single memory controller, wherein each rank group of the at least two rank groups comprises at least two ranks, wherein first portions of address information in addresses of ranks in one rank group of the at least two rank groups are the same, wherein a first mapping relationship exists between the first portion of address information and information about a first preset location in a physical address of a memory page in the memory, and wherein the first preset location is a portion of page number information in the physical address; and selecting, by the processor from idle memory pages, a to-be-allocated memory page for the virtual address, wherein the information about the first preset location in a physical address of the memory page that is selected as the to-be allocation memory page is the same as the first portions of address information in addresses of ranks in the target rank group, and wherein storage units in the to-be-allocated memory page are distributed in ranks in the target rank group.

2. The memory allocation method according to claim 1, wherein an address of each rank in the memory further comprises a second portion of address information, wherein a second mapping relationship exists between the second portion of address information and information about a second preset location in a physical address of a memory page, and wherein the second preset location is a portion of page offset information in the physical address.

3. The memory allocation method according to claim 1, wherein the selecting the target rank group from the at least two rank groups comprises:

selecting, by the processor from the at least two rank groups, a rank group with a largest access traffic as the target rank group.

4. The memory allocation method according to claim 1, wherein the selecting the target rank group from the at least two rank groups comprises:

obtaining, by the processor, access traffic of ranks in the at least two rank groups; and selecting, by the processor, a second rank group in the at least two rank groups as the target rank group in response to access traffic of a first rank in a first rank group of the at least two rank groups exceeding a total access traffic of other ranks in the at least two rank groups, wherein access traffic of the second rank group is less than access traffic of the first rank group.

5. The memory allocation method according to claim 1, wherein the selecting the target rank group from the at least two rank groups comprises:

obtaining, by the processor, access traffic of ranks in the at least two rank groups; and selecting as the target rank group, by the processor, from the at least two rank groups, a rank group having a rank whose access traffic is less than a first preset threshold and is greater than o.

6. The memory allocation method according to claim 1, wherein the selecting the target rank group from the at least two rank groups comprises:

selecting as the target rank group, by the processor from the at least two rank groups, a rank group whose access traffic is less than a second preset threshold and is greater than o.

7. A computing device, comprising:

a memory comprising at least two rank groups, wherein the at least two rank groups being controlled by a single memory controller, wherein each rank group of the at least two rank groups comprises at least two ranks, wherein first portions of address information in addresses of ranks in one rank group of the at least two rank groups are the same, wherein a first mapping relationship exists between the first portion of address information and information about a first preset location in a physical address of a memory page in the memory, and wherein the first preset location is a portion of page number information in the physical address; and a processor coupled to the memory, the processor configured to:

receive a memory access request, wherein the memory access request carries a to-be-accessed virtual address;

select a target rank group from the at least two rank groups, according to access traffic of the at least two rank groups, and in response to determining that no memory page has been allocated to the virtual address; and select, from idle memory pages, a to-be-allocated memory page for the virtual address, wherein the information about the first preset location in a physical address of the memory page that is selected as the to-be allocation memory page is the same as the first portions of address information in addresses of ranks in the target rank group, and wherein storage units in the to-be-allocated memory page are distributed in ranks in the target rank group.

8. The computing device according to claim 7, wherein an address of each rank in the memory further comprises a second portion of address information, wherein a second mapping relationship exists between the second portion of address information and information about a second preset location in a physical address of a memory page, and wherein the second preset location is a portion of page offset information in the physical address.

9. The computing device according to claim 7, wherein the processor being configured to select the target rank group from the at least two rank groups comprises the processor being configured to:

select, from the at least two rank groups, a rank group with a largest access traffic as the target rank group.

10. The computing device according to claim 7, wherein the processor being configured to select the target rank group from the at least two rank groups comprises the processor being configured to:

select, in response to access traffic of a first rank in a first rank group of the at least two rank groups exceeding total access traffic of other ranks in the at least two rank groups, a second rank group in the at least two rank groups as the target rank group, wherein access traffic of the second rank group is less than access traffic of the first rank group.

11. The computing device according to claim 7, wherein the processor being configured to select the target rank group from the at least two rank groups comprises the processor being configured to:

obtain access traffic of ranks in the at least two rank groups; and select as the target rank group, from the at least two rank groups, a rank group having a rank whose access traffic is less than a first preset threshold and is greater than o.

12. The computing device according to claim 7, wherein the processor being configured to select the target rank group from the at least two rank groups comprises the processor being configured to:

select as the target rank group, from the at least two rank groups, a rank group whose access traffic is less than a second preset threshold and greater than o.

13. A non-transitory computer readable storage medium comprising one or more computer-executable instructions, wherein the one or more computer-executable instructions, when executed on a processor of a computer system, cause the processor to:
receive a memory access request requesting access to a memory of the computer system, wherein the memory access request carries a to-be-accessed virtual address;
select a target rank group from at least two rank groups in the memory according to access traffic of the at least two rank groups in response to determining that no memory page has been allocated to the virtual address, wherein the at least two rank groups being controlled by a single memory controller, wherein each rank group of the at least two rank groups comprises at least two ranks, wherein first portions of address information in addresses of ranks in one rank group of the at least two rank groups are the same, wherein a first mapping relationship exists between the first portion of address information and information about a first preset location in a physical address of a memory page in the memory, and wherein the first preset location is a portion of page number information in the physical address; and
select, from idle memory pages, a to-be-allocated memory page for the virtual address, wherein the information about the first preset location in a physical address of the memory page that is selected as the to-be allocation memory page is the same as the first portions of address information in addresses of ranks in the target rank group, and wherein storage units in the to-be-allocated memory page are distributed in ranks in the target rank group.

14. The non-transitory computer readable storage medium of claim 13, wherein the instructions that cause the processor to select the target rank group from the at least two rank groups include instructions to:
select, from the at least two rank groups, a rank group with a largest access traffic as the target rank group.

15. The non-transitory computer readable storage medium of claim 13, wherein the instructions that cause the processor to select the target rank group from the at least two rank groups include instructions to:
obtain access traffic of ranks in the at least two rank groups; and
select a second rank group in the at least two rank groups as the target rank group in response to access traffic of a first rank in a first rank group of the at least two rank groups exceeding total access traffic of other ranks in the at least two rank groups, wherein access traffic of the second rank group is less than access traffic of the first rank group.

16. The non-transitory computer readable storage medium of claim 13, wherein the instructions that cause the processor to select the target rank group from the at least two rank groups include instructions to:
obtain access traffic of ranks in the at least two rank groups; and
select as the target rank group, by the processor from the at least two rank groups, a rank group having a rank whose access traffic is less than a first preset threshold and is greater than 0.

17. The non-transitory computer readable storage medium of claim 13, wherein the instructions that cause the processor to select the target rank group from the at least two rank groups include instructions to:
select as the target rank group, from the at least two rank groups, a rank group whose access traffic is less than a second preset threshold and is greater than 0.

18. The method according to claim 1, further comprising determining that no memory page has been allocated to the virtual address in response a mapping relationship between the to-be-accessed virtual address and the physical address not being recorded.

19. The computing device according to claim 8, wherein the processor is further configured to determine that no memory page has been allocated to the virtual address in response a mapping relationship between the to-be-accessed virtual address and the physical address not being recorded.

20. The non-transitory computer readable storage medium according to claim 13, wherein the one or more computer-executable instructions, when executed on a processor of a computer system, further cause the processor to determine that no memory page has been allocated to the virtual address in response a mapping relationship between the to-be-accessed virtual address and the physical address not being recorded.

* * * * *

UNITED STATES PATENT AND TRADEMARK OFFICE
CERTIFICATE OF CORRECTION

PATENT NO. : 11,232,031 B2
APPLICATION NO. : 16/419260
DATED : January 25, 2022
INVENTOR(S) : Xiao et al.

It is certified that error appears in the above-identified patent and that said Letters Patent is hereby corrected as shown below:

In the Claims

Claim 5, Column 13, Line 52; delete "greater than o" and insert --greater than 0--.

Claim 6, Column 13, Line 59; delete "greater than o" and insert --greater than 0--.

Claim 11, Column 14, Line 60; delete "greater than o" and insert --greater than 0--.

Claim 12, Column 14, Line 67; delete "greater than o" and insert --greater than 0--.

Claim 16, Column 16, Line 17; delete "greater than o" and insert --greater than 0--.

Claim 16, Column 16, Line 24; delete "greater than o" and insert --greater than 0--.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*